United States Patent
Schroer

(10) Patent No.: US 6,527,264 B2
(45) Date of Patent: Mar. 4, 2003

(54) TORSION SPRING FOR COUNTER BALANCING WEIGHTS PARTICULARLY IN SECTIONAL DOORS

(76) Inventor: Bernt Schroer, Völlinghauser Strasse 44, D-59609 Anröchte (DE)

( * ) Notice: Subject to any disclaimer, the term of this patent is extended or adjusted under 35 U.S.C. 154(b) by 58 days.

(21) Appl. No.: 09/901,435

(22) Filed: Jul. 9, 2001

(65) Prior Publication Data

US 2002/0003328 A1 Jan. 10, 2002

(30) Foreign Application Priority Data

Jul. 10, 2000 (EP) .............................. 00114773

(51) Int. Cl.⁷ .................................................. F16F 1/06
(52) U.S. Cl. ...................................... 267/155; 267/275
(58) Field of Search .......................... 267/275, 155, 267/273, 154

(56) References Cited

U.S. PATENT DOCUMENTS

| | | | | |
|---|---|---|---|---|
| 1,087,186 A | * | 2/1914 | Scholfield ................. | 434/245 |
| 1,462,925 A | * | 7/1923 | Wiburger .................. | 402/53 |
| 2,028,122 A | * | 1/1936 | Floreth .................... | 267/73 |
| 2,350,286 A | * | 5/1944 | Michelman ............... | 160/271 |
| 3,055,689 A | * | 9/1962 | Jorgensen ................ | 292/70 |
| 3,132,860 A | * | 5/1964 | Nantz ...................... | 472/105 |
| 4,852,378 A | * | 8/1989 | Greco ...................... | 72/379.2 |
| 4,882,806 A | * | 11/1989 | Davis ....................... | 16/198 |
| 4,886,256 A | * | 12/1989 | Nishiyama et al. ...... | 267/221 |
| 4,940,357 A | * | 7/1990 | Davis ....................... | 403/344 |
| 5,239,777 A | * | 8/1993 | Husselton ................ | 49/200 |
| 5,464,197 A | * | 11/1995 | Ecclesfield .............. | 267/155 |
| 5,620,170 A | * | 4/1997 | Shibata et al. .......... | 267/179 |
| 6,220,586 B1 | * | 4/2001 | Pavlin et al. ............. | 267/155 |
| 6,327,744 B1 | * | 12/2001 | Dorma ..................... | 16/197 |
| 6,408,925 B1 | * | 6/2002 | Dorma ..................... | 160/191 |

* cited by examiner

*Primary Examiner*—Jack Lavinder
*Assistant Examiner*—Benjamin A Pezzlo
(74) *Attorney, Agent, or Firm*—Thomas, Kayden, Horstemeyer & Risley, LLP

(57) ABSTRACT

A torsion spring which is coiled or wound from spring steel wire is provided for counterbalancing weight, particularly in sectional doors. At least one of the two spring ends of the torsion spring has a connection diameter which is reduced with regard to the operational diameter of the torsion spring in a main portion between the spring ends. This connection diameter is adjusted to the outer diameter of a shaft on which the torsion spring is to be arranged in such a way that the torsion spring is guided on the shaft in a radial direction by means of any portion of the torsion spring having the connection diameter.

10 Claims, 3 Drawing Sheets

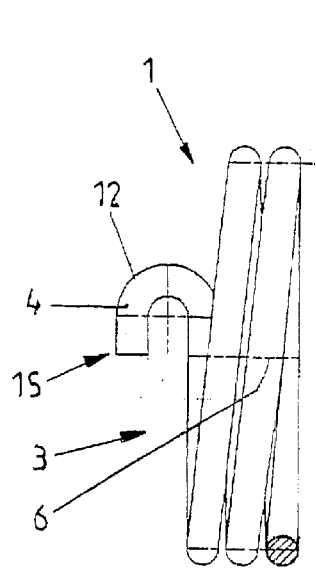
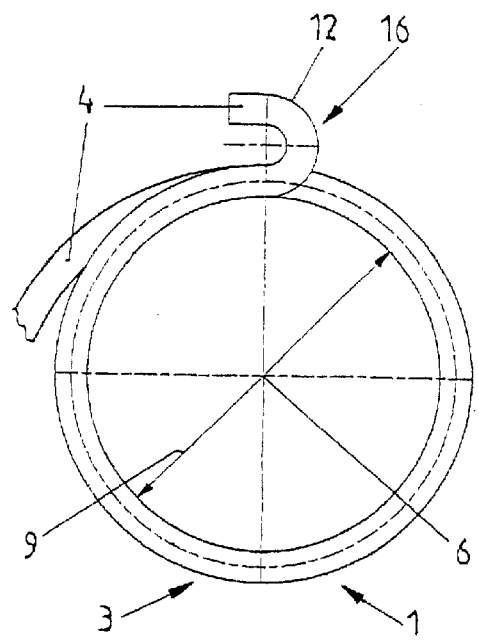
Fig. 5  Fig. 6
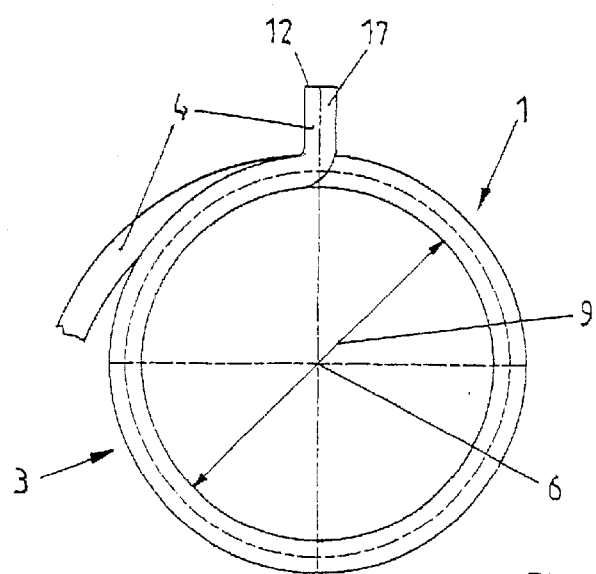
Fig. 7

TORSION SPRING FOR COUNTER BALANCING WEIGHTS PARTICULARLY IN SECTIONAL DOORS

FIELD OF THE INVENTION

The invention relates to a torsion spring coiled or wound from spring steel wire for counterbalancing weights. In particular, the invention relates to a torsion spring for counterbalancing weights in sectional doors. The torsion spring is to be mounted on a shaft and at least one of the spring ends of the torsion spring has a connection diameter which is reduced as compared to the operational diameter of the torsion spring between the spring ends.

BACKGROUND OF THE INVENTION

Torsion springs are used for counterbalancing weights in sectional doors which are used as garage and industrial doors to an increasing extent.

The basic form of coiled or wound torsion springs for counterbalancing weights is cylindrical. In the most simple case, such a torsion spring has a constant diameter over its entire length from its one spring end to its other spring end and inclusive of the spring ends themselves, where the constant diameter of the torsion spring corresponds to the operational diameter of the torsion spring. Mounting the torsion spring to a shaft which is torsional-elastically supported by the torsion spring is typically effected by means of a stationary fixed cone, which does not rotate with the shaft, and a tension cone arranged on and fixed to the shaft. The respective spring end is pushed onto the respective cone, and it is, as a rule, secured to the cone by means of clamping the wire, to which end a securing element may be formed of spring wire at the respective end which assists in fixing the spring end. Fixing the spring ends to the cones is laborious. Further, the costs of the cones themselves are considerable, particularly when different cones have to be used which are matched to the respective operational diameter. In the case of cylindrical torsion springs, which are only guided by cones with regard to the shaft, there is a further problem of distortion in the case of torsional stress on the torsion spring. This distortion can be counteracted by a support element, which is inserted into the torsion spring. This support element, however, is only secured within the torsion spring, while the torsion spring itself is built-in. Because of that, the support elements will easily fall out of the torsion spring.

From EP 965 399 A2 it is known to wind the spring ends of a spiral shaped torsion spring with a smaller connection diameter than the operational diameter of the main portion of the torsion spring, which results in a torsion spring of the type described above. Thus it is possible, in the case of torsion springs for different loads, to wind the spring ends with the same connection diameter, i.e. with different operation diameters and wire diameters. In this way the same connection elements may be used and, e.g., a common axial length of the torsion springs independent of their loads becomes realizable. Adjusting the torsion springs for their respective loads is primarily effected by means of its operational diameter within the main portion of the torsion springs between their spring ends. In case of such torsion springs with reduced spring ends, however, it is difficult to support the main portion between the spring ends in a radial direction by means of support elements.

To this end, EP 965 399 A2 proposes to introduce a support element, in the form of a tube segment, into the main portion of the torsion spring during winding. After winding the second spring end, this support element is fixed within the torsion spring by means of the reduced spring ends. Introducing the supporting elements during winding is indeed very difficult. In addition, even though the same securing element may be used regardless of the operational diameter of the torsion spring, which makes stocking the securing element more simple, securing the spring ends is still very laborious. Therefore, the known torsion springs are still used with cones.

In the case of a torsion spring with a cylindrical diameter, it is known to fix one spring end without using a cone. Instead, the last winding of the spring steel wire at the respective spring end is clamped to a plate at several spaced apart points. The plate is used for rotationally mounting the shaft on which the torsion spring is arranged and the clamping points are arranged on an arc around the rotating axis of the shaft. This known attachment allows for avoiding the fixed cone, which reduces costs. The work effort for this kind of attachment, however, is considerable. Additionally, not only the attachment of the spring end itself has to be carried out in a laborious way, but at the same time, the coaxial orientation of the spring end has to be adjusted with regard to the inner shaft.

It is an object of the invention to disclose a torsion spring for counterbalancing weights, which may be mounted with low efforts of material and work.

SUMMARY OF THE INVENTION

According to the invention, this object is achieved in that the connection diameter of the torsion spring is matched to the outer diameter of the torsion spring in such a way that the torsion spring is guided on the shaft by its portions having the connection diameter.

In case of the new torsion spring, there is no need to coaxially align the spring end having the connection diameter with the shaft by means of a securing element, such as a cone. The coaxial alignment is achieved between the spring end and the shaft itself because the portion of the torsion spring having the connection diameter is guided on the shaft. This reduces the function of securing elements for the torsion spring to a fixed connection to the shaft or a stationary bearing. Axial forces, which occur between a cone and a spring end, for example, no longer have to be supported. It is possible to totally concentrate on the support of tangential forces. If, at the same time, shafts with a standard outer diameter are used even in case of different environments, only a few different securing elements is sufficient, since they are used independently of the operational diameter of the respective torsion spring. As a result, one single embodiment of very simple and thus low-cost securing elements can be used, and the kind of attachment provides further advantages with regard to the work efforts for the attachment. There is no danger, however, that the torsion spring under working stress is reduced in its connection diameter to such an extent that it jams on the shaft in an undesired way. Within the portions of the spring having the reduced connection diameter as compared to the operational diameter, diameter reductions due to stress on the torsion spring are hardly visible.

It is to be understood that the new torsion spring preferably has a connection diameter at both spring ends which is reduced as compared to the operational diameter of the torsion spring between the spring ends. In this case, use can be made of the advantages of the new torsion spring in the new area of both end attachments.

Additionally, it is possible to reduce the torsion spring from its connected operational diameter down to its connection diameter and to expand it again up to its operational diameter at least once between the spring ends. The resulting additional portion having the connection diameter forms a further guiding point for the coaxial alignment of the torsion spring with regard to the shaft.

Each portion having the connection diameter over at least three quarters of a full spring winding already can exert a guiding function. It is preferred, however, that the torsion spring has the connection diameter over 1 to 5 full spring winding within each of these portions to form a defined ring shaped and closed guidance with regard to the shaft.

In particular, where a rotational movement takes place between the torsion spring and the shaft, a gliding coating or a gliding sleeve can be provided at the inside of the torsion spring in at least one portion having the connection diameter. The torsion spring abuts against the shaft via the gliding coating or gliding sleeve. This is not a case of bridging sleeves, by which different connection diameters of the spring ends may be fitted to a shaft with a fixed outer diameter. Instead it is only a matter of reducing the friction between the torsion spring and the shaft.

In the new torsion spring, an anchor element for taking up tangential forces can be formed of spring steel wire at at least one the spring ends. It is possible to only use this anchor element for fixing the respective spring end, as indeed only tangential forces have to be supported between the spring end and the shaft or a stationary bearing, respectively.

The anchor element made of spring steel wire can, for example, be a spring arm running tangentially to the connection diameter. It is also possible to have a radically or axially extending spring arm or to bend a hook in one of these directions.

Within a spring arrangement, the new torsion spring is mounted on a shaft in such a way that its one spring end is fixed to the shaft and that its other spring end is fixed to an element to which the shaft is rotationally mounted to. In other words, the other spring end of the torsion spring is stationary.

In the following, the invention is further explained and described by means of embodiment examples which are depicted in the accompanying drawings.

SHORT DESCRIPTION OF THE DRAWINGS

FIG. 5 shows one spring end of a third modified embodiment of the new torsion spring.

FIG. 6 shows one spring end of a fourth modified embodiment of the new torsion spring.

FIG. 7 shows one spring end of a further modified embodiment of the new torsion spring.

DETAILED DESCRIPTION OF THE PREFERRED EMBODIMENTS

Figure 2:
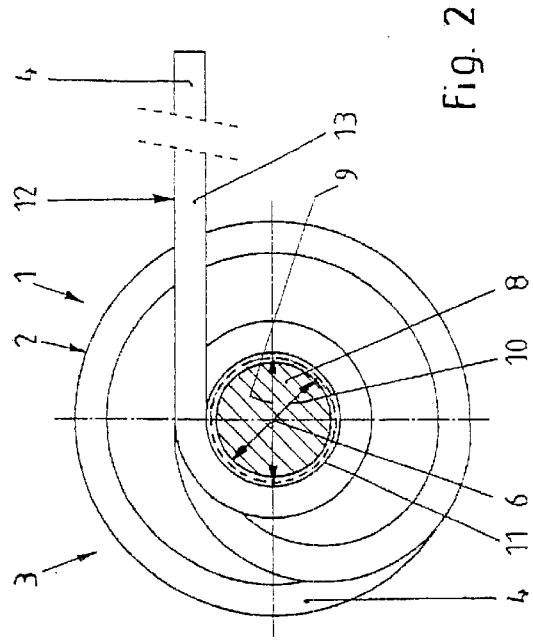
FIG. 2 shows the spring end according to FIG. 1 in a view direction of the spring axes, the torsion spring being arranged on a shaft.
Figure 1:
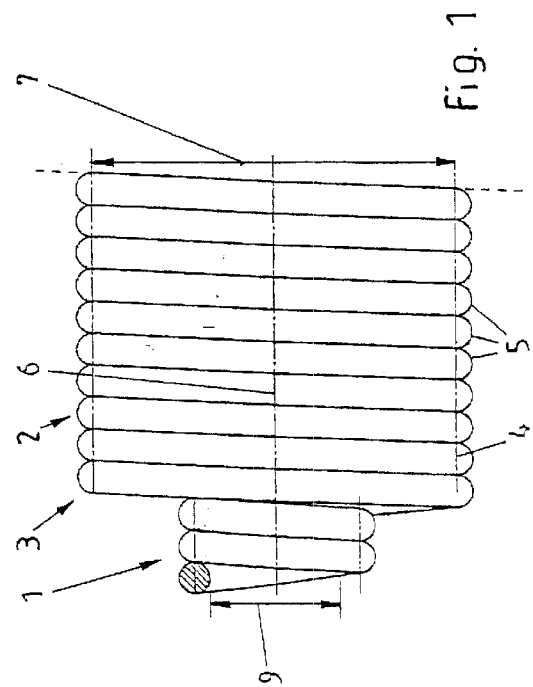
FIG. 1 shows a spring end and one adjacent part of a main portion of a first embodiment of the new torsion spring in a side view onto the spring axis.

The torsion spring 3 shown in FIG. 1 has a spring end 1 and an adjacent main portion 2 and is wound from spring steel wire 4. Alternatively, it may be coiled from spring steel wire 4. The single spring windings 5 of the torsion spring 3 run spirally around a spring axis 6. Within the main portion 2 the torsion spring 3 has an operational diameter 7 by means of which, in addition to adjusting the spring steel wire 4 and its length, the torsion spring 3 is adjusted to its particular use. This use is counterbalancing weights, to which end the torsion spring 3 supports a shaft 8, depicted in FIG. 2, in a torsional-elastic way. Shaft 3 is used for directly or indirectly taking up holding ropes or the like of a sectional gate, for example, so that upon pulling the holding rope off the shaft 8, i.e. with increasing weight, the torsion spring 3 is torsionally stressed and exerts counter-forces to the increasing weights to be supported. In order to guide the torsion spring 3, for some spring windings 5 within the area of its depicted spring end 1, torsion spring 3 is reduced to a connection diameter 9. Connection diameter 9 is adjusted to an outer diameter 10 of the shaft in such a way that the spring end 1 is supported in a radial direction with regard to the spring axis 6 by the shaft 8 in such a way that a coaxial alignment of the torsion spring 3 on the shaft 8 is achieved. Within a free space between the shaft 8 and the portion of the torsion spring 3 having the connection diameter 9, a gliding sleeve 11 or another gliding means may be provided for reducing the friction between the shaft 8 and the torsion spring 3. A securing element for a fixed support of the spring end 1 with regard to the shaft 8 or with regard to a stationary rotating bearing for the shaft 8, which is not depicted here, supports only tangential forces between the shaft 8 and the torsion spring 3. To this end, an anchor element 11 made of spring steel wire 4 is formed at the spring end 1 of the torsion spring according to FIGS. 1 and 2, in the form of a spring arm 13 running tangentially with regard to the outer diameter 6. This spring arm can be fixed in a simple way to a stationary wall of a housing, for example.

Figure 3:
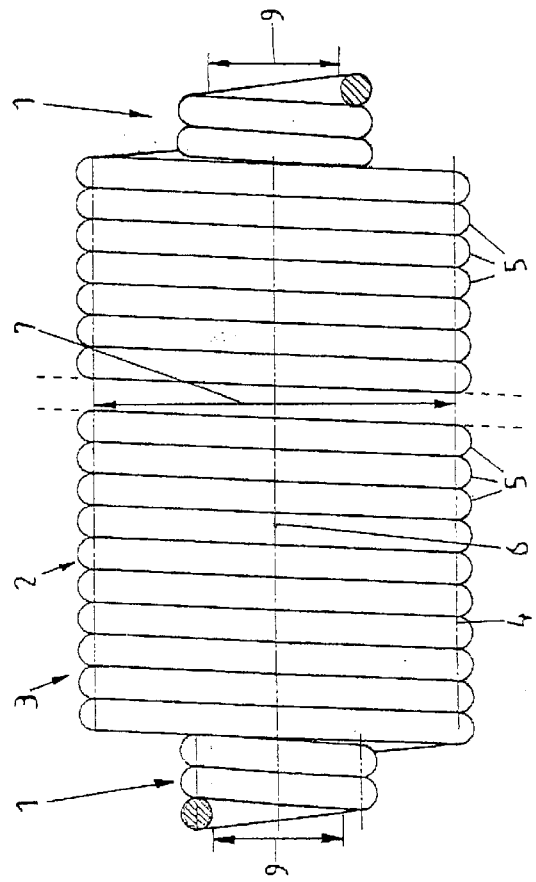
FIG. 3 shows the whole torsion spring according to FIG. 1 in a side view onto the spring axis.
Figure 4:
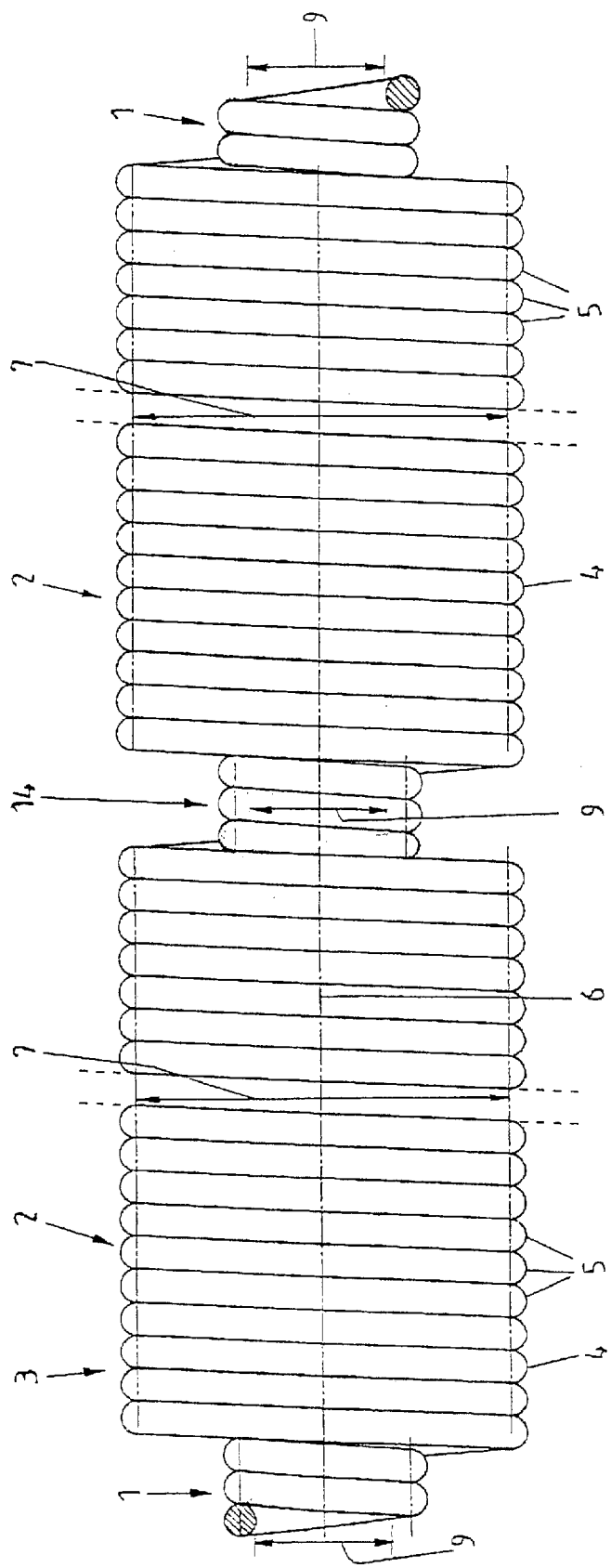
FIG. 4 shows a second embodiment of the new torsion spring modified with regard to FIGS. 1 to 3.

Whereas FIG. 1 does not show how the respective second spring end of the torsion spring 3 is formed, FIG. 3 makes clear that both spring ends 1 have the reduced connection diameter 9, which is matched to the outer diameter of the shaft 8 (again not depicted here). However, it is also possible to choose another connection diameter 9 for the stationary support of one spring end, which, for example, is adjusted to a supporting ring around a rotational bearing for the shaft. This, however, is not necessary, as even in case of a torsional stress on the torsion spring 3 there is no danger that the connection diameter 9 is reduced to such an extent that a stationary spring end jams into the rotating shaft. In the area of the connection diameter 9 reduced with regard to the operational diameter 7, reductions of the diameter resulting from a torsional stress on the torsion spring only occur on a strongly reduced level so that they may be neglected in terms of guiding the torsion spring with regard to the shaft.

Because of this, it is also possible to reduce the diameter of the torsion spring 3 within its main portion 2 from its operational diameter 7 down to the connection diameter 9 and to afterwards expand it again up to the operational diameter 7, to form supporting portions 14 by means of which the torsion spring 3 is supported at one or more points distributed over its length at the shaft 8 (not depicted here). In this way the coaxial arrangement of the torsion spring with regard to the shaft is also ensured in the middle portion of the torsion spring 3 without any additional supporting element.

FIG. 5 shows the spring end 1 of an embodiment of the torsion spring at which a hook 15 made of the spring wire steel 4 is formed as a anchor element 12, which mainly extends in parallel with the spring axis 6.

According to FIG. 6 a hook 16 is formed as an anchor element, which essentially extends radially to the spring axis 6.

According to FIG. 7 the anchor element 12 is a radially extending spring arm 17.

What is claimed is:

1. A spiral shaped torsion spring for counter-balancing a sectional door, said torsion spring being supported on a shaft and having two spring end portions, and a main portion between said two spring end portions, said main portion of said torsion spring having an operational diameter, at least one of said spring ends having a reduced connection diameter which is reduced with regard to said operational diameter of said main portion, wherein said connection diameter is adjusted to the outer diameter of the shaft so that the torsion spring is guided on the shaft in a radial direction by means of said connection diameter.

2. The torsion spring according to claim 1, wherein both spring end portions of said torsion spring the connection diameter.

3. The torsion spring according to claim 1, wherein the torsion spring has at least one intermediate portion having the reduced diameter within said main portion, adjacent to which at least one portion of said torsion spring is on the one side reduced from said operational diameter down to said connection diameter and on the other side expanded from said connection diameter up to said operational diameter again.

4. The torsion springs according to claim 1, wherein each portion of said torsion spring having the reduced connection diameter has said connection diameter for 1 to 5 full spring windings.

5. The torsion spring according to claim 1, wherein gliding means selected from a gliding coating and a gliding sleeve are arranged at the inside of said torsion spring within at least one said portion having said reduced connection diameter.

6. The torsion spring according to claim 1, wherein an anchor element axis is formed from the spring steel wire at at least one of said spring end portions.

7. The torsion spring according to claim 6, wherein said anchor element is a spring arm running tangentially with regard to the connection diameter.

8. The torsion spring according to claim 1, which is made by coiling.

9. The torsion spring according to claim 1, which is made by winding.

10. The torsion spring according to claim 1, wherein one said spring end portion of the torsion spring is fixed to the shaft and the other spring end portion of the torsion spring is fixed to said sectional door to which the shaft is rotatingly mounted.

* * * * *